(12) United States Patent
Nagai et al.

(10) Patent No.: US 7,093,534 B2
(45) Date of Patent: Aug. 22, 2006

(54) METHOD OF MANUFACTURING PRODUCTS OF SOYMILK AND APPARATUS OF MANUFACTURING THE SAME

(75) Inventors: Mitsuo Nagai, Hiroshima (JP); Osamu Moriyama, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 523 days.

(21) Appl. No.: 10/421,816

(22) Filed: Apr. 24, 2003

(65) Prior Publication Data

US 2004/0247765 A1    Dec. 9, 2004

(30) Foreign Application Priority Data

Apr. 24, 2002  (JP) .......................... P2002-122207

(51) Int. Cl.
*B30B 9/06* (2006.01)

(52) U.S. Cl. ..................... 99/513; 100/113; 100/127; 100/178; 100/216

(58) Field of Classification Search .............. 99/485, 99/495, 509, 510, 513; 100/104, 110, 113, 100/126–128, 177–178, 214–216
See application file for complete search history.

(56) References Cited

U.S. PATENT DOCUMENTS

| | | | | |
|---|---|---|---|---|
| 2,186,066 A | * | 1/1940 | Ford et al. | 99/485 |
| 5,309,958 A | * | 5/1994 | Ueda et al. | 141/90 |
| 5,701,810 A | * | 12/1997 | Nakai | 99/495 |
| RE36,178 E | * | 4/1999 | Freudinger et al. | 222/309 |
| 5,974,959 A | * | 11/1999 | Johnson et al. | 100/37 |
| 6,854,382 B1 | * | 2/2005 | Jan | 99/510 |

FOREIGN PATENT DOCUMENTS

| | | |
|---|---|---|
| JP | 8-89197 | 4/1996 |
| JP | 11-299443 | 11/1999 |
| JP | 2000-60473 | 2/2000 |
| JP | 2000-102357 | 4/2000 |

* cited by examiner

*Primary Examiner*—Drew Becker
(74) *Attorney, Agent, or Firm*—Sughrue Mion, PLLC

(57) ABSTRACT

The invention comprises the steps of storing immersed or smothered raw material of soy beans including hulls in a storage chamber provided at the front part of a cylinder barrel, subsequently passing the stored raw material of soybeans through screens furnished at the front end of the cylinder barrel by driving a piston, and urging to press it out, thereby to manufacture a milk of the soy beans of the raw material being extremely refined. At this time, the screens are 60 to 500 meshes, and the pressure is 8.0 to 55.0 MPa.

3 Claims, 2 Drawing Sheets

METHOD OF MANUFACTURING PRODUCTS OF SOYMILK AND APPARATUS OF MANUFACTURING THE SAME

The present application is based on Japanese Patent Application No. 2002-122207, the entire contents of which are incorporated herein by reference.

BACKGROUND OF THE INVENTION

1. Field of the Invention

The present invention relates to a method of manufacturing products of soymilk, an apparatus of manufacturing the same, and in particular to a method enabling to process all of raw material of soybeans into soybean processed foods such as soymilk or bean curds, that is, products of soymilk without creating lees of bean curds, and an apparatus used to reducing this method to practice.

2. Related Art

While manufacturing soymilk and bean curds, lees of bean curd are much created. Parts of much created lees of bean curd are used as forage or manure, otherwise least parts are used to food materials. Containing much water content and plenty of nutriments, the lees of bean curd are soon corrupted and are almost dealt with as industrial waste. Dealing with as the industrial waste, environmental problems occur, and it is not desirable in view of food problems to waste the lees of bean curd containing much nutriments. For these reasons, effective use thereof has been taken as a theme. There have accordingly been several proposals for decreasing the amount of creating the lees of bean curd during manufacturing soymilk and bean curds, or bringing it to zero. For instance, Japanese Patent Laid Open No. 2000-60473 discloses a method of pulverizing the raw material of soy beans by a grinding apparatus to take in fibrous content into products of bean curds for discharging no lees of bean curd. Japanese Patent Laid Open No. 299443/1999 shows a method of adding enzyme to the lees of bean curd, causing reaction of enzyme while carrying out mechanically fine pulverization to take in fibrous content into products of bean curds for discharging no lees of bean curd. Further, Japanese Patent Laid open No. 89197/1996 shows a method of adding ferment when immersing the raw material of soy beans for lowering creation of the lees of bean curd. In addition, Japanese Patent Laid Open No. 2000-102357 discloses a method of subjecting a suspension containing all grains of soybeans to a wet jet mill, and causing the suspension to collide one another and/or to a wall face at pressure of more than 100 MPa and/or rate of flow of more than 200 m/sec so as to extremely refine all the bean contents, thereby to take in fibrous content into products of bean curds for discharging no lees of bean curd.

According to the above proposed or disclosed methods of manufacturing products of soymilk, effects are obtained as they are, but themes or problems to be settled are not a few. For example, in the invention disclosed in Laid Open No. 2000-60473, although depending on the grinding apparatus, the lees of bean curd of large grains exist in the manufactured soymilk, and there is a theme that the lees of bean curd must be filtrated after all for feeling soft to the tongue. The inventions of No. 299443/1999 and No. 89197/1996 are involved with problems of taking a long time for reacting enzyme and needing a technique of high level for processing the enzyme. Further, since the invention of No. 2000-102357 applies the raw material of soy beans to the wet jet mill, it is necessary to pulverize grain diameters in the suspension containing all grains of soy beans to be less than 300 to 500 μm, so that an operating process is complicated.

SUMMARY OF THE INVENTION

The invention has been built in view of the above mentioned circumstances, and accordingly it is an object of the invention to provide a method of manufacturing soymilk products from the raw material of soy beans of all grains including the hulls and an apparatus used to reducing this method to practice, neither needing any especial grinding apparatus nor taking a long time as reacting the enzyme or creating the lees of bean curd via a simple operation, and manufacturing the products of soy bean processed foods such as soymilk or bean curds being soft feeling to the tongue.

A method of manufacturing soymilk products according to the invention is characterized by comprising storing an immersed or smothered raw material of soy beans including hulls at a front part of a cylinder barrel through a raw material supply passage, subsequently passing the stored raw material of soy beans through a homogenizing unit, that is, screens furnished at a front end of the cylinder barrel by driving a piston in an axial direction, and urging to press it out, thereby to manufacture products of a milk of the soy beans of the raw material being extremely refined.

An apparatus of manufacturing soymilk products according to the invention is characterized by comprising a cylinder barrel, a piston provided movably in the axial direction within the cylinder barrel, a drive device of driving the piston in the axial direction, a ring furnished movably in the axial direction at a front part of the piston, and a homogenizing unit equipped at a front end of the cylinder barrel, in which when the piston is driven by the drive device, a raw material of soy beans including hull stored at a front side of the cylinder barrel is pressed out from the homogenizing unit, wherein the homogenizing unit comprises screens of predetermined mesh, the piston is defined at the interior thereof with a supply passage of the raw material of soy beans, which communicates with the piston at the front part of the cylinder barrel via a passage formed between the ring and a head part of the piston when retreating the piston, and the passage is shut off when advancing the same.

The apparatus of manufacturing soymilk products according to the invention is characterized in that the homogenizing unit comprises the screens and screen supporters for supporting the same, the screen supporters are composed of a plate-like member having a plurality of through holes, and scales of the screens are selected to be 60 to 500 meshes.

BRIEF DESCRIPTION OF THE DRAWINGS

FIG. 2A is a side view of the part of the homogenizing unit, and FIG. 2B is a side view showing the condition where the piston drives the front part of the cylinder barrel in the pressing direction.

DETAILED DESCRIPTION OF THE PREFERRED EMBODIMENTS

Figure 1:
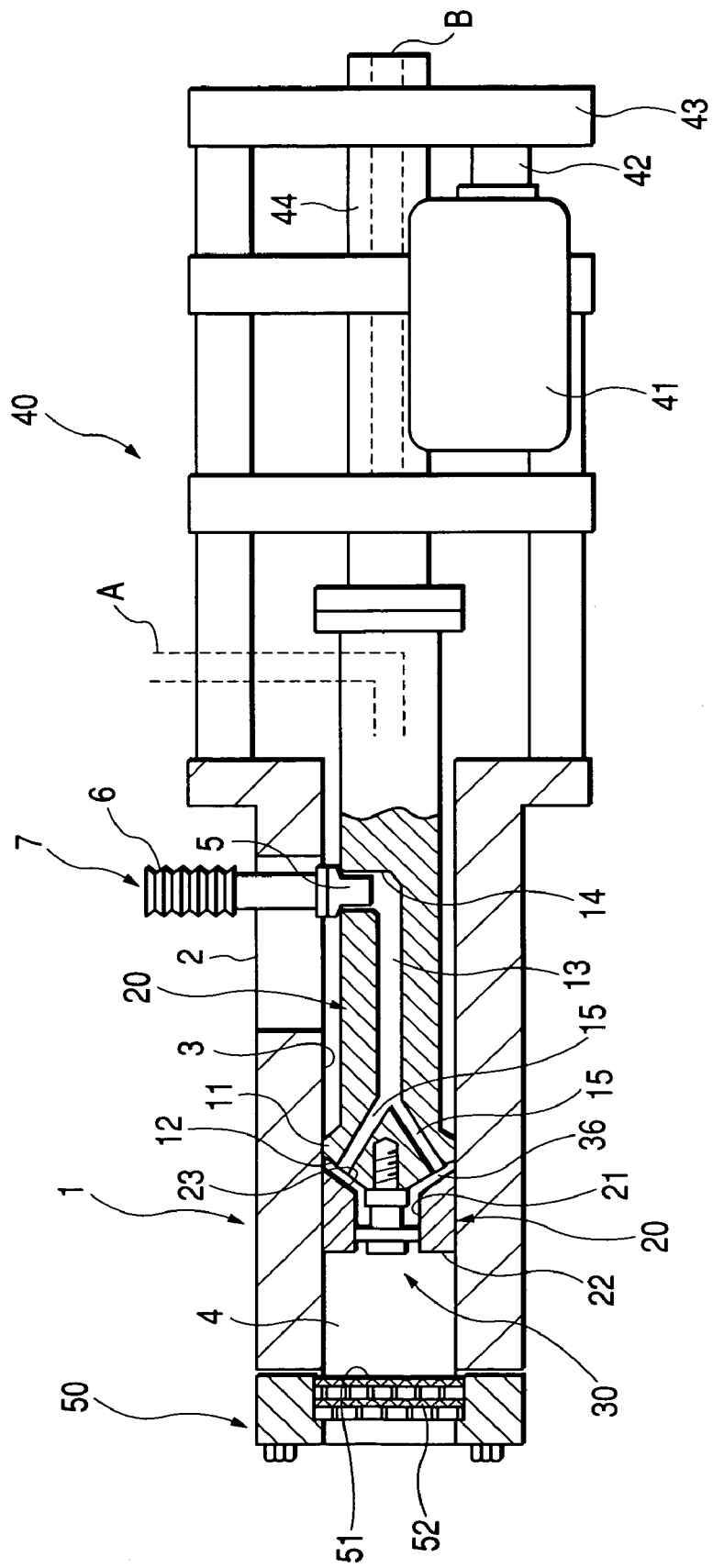
FIG. 1 is across sectional and side view showing, partially in section, the apparatus of manufacturing soymilk products concerned with the embodiment of the invention.

Explanation will be made to an embodiment of the invention with reference to FIGS. 1, 2A and 2B of the attached drawings. The apparatus of manufacturing soymilk products comprises, as schematically shown in FIG. 1, a cylinder barrel 1, a piston 10 provided movably in the axial direction within the cylinder barrel, a homogenizing unit 50 equipped at the front end of the cylinder barrel 1, a piston drive device 40 furnished at the rear part of the cylinder barrel 1, and a supply pipe 7 for supplying the raw material of soy beans.

The cylinder barrel 1 has a predetermined length in the axial direction, and is, as shown in FIG. 1, based on a premise that an axial center is arranged in a lateral direction. Toward the rear side of the cylinder barrel 1, an opening 2 is provided for taking in the supply pipe 7 for supplying the raw material of soy beans into the piston 10, said opening being made in a determined length in the axial direction. Accordingly, when the piston 10 is driven in the axial direction, the supply pipe 7 may move in the axial direction following the piston 10. The interior of the front portion of the thus structured cylinder barrel 1 is provided with a storage chamber 4, and the piston drive device 40 is equipped at the rear part of the cylinder barrel 1.

In an inner hole 3 of the cylinder barrel 1, the piston 10 is movable in the axial direction, that is, back and forth. The piston 10 is smaller in diameter at the axial portion than the inner hole 3 of the cylinder barrel 1 but becomes larger at the piston head portion 11 of the front part, and the piston 10 is driven as contacting at an outer circumference the inner circumference of the inner hole 3 of the cylinder barrel 1. The piston head portion 11 is tapered 12 at a front end portion by reducing a diameter toward the front end which is formed with a female screw in the axial direction. Such a piston 10 is provided at the interior with the raw material supply passage 13 in the axial direction. The raw material supply passage 13 communicates at the rear part with a radius directional supply passage 14 opening outward in a radius direction. The position of the radius directional supply passage 14 corresponds to the opening 2 of the cylinder barrel 1. The raw material supply passage 13 communicates at its front end with a plurality of diverged supply passages 15, 15 . . . which expand in taper toward the taper parts 12 of the piston head portion 11. The radius directional supply passage 14 is mounted with an adapter 5 which connects a supply pipe 7 comprising a flexible pipe 6 for supplying the raw material of soy beans. The piston 10 is appropriately divided and mechanically processed with the radius directional supply passage 14, the diverged supply passages 15, 15 . . . , and FIG. 1 does not show the divided conditions for processing.

The piston 10 is attached at the front end with a ring 20 owing to a ring head 30. The ring 20 takes a substantially cylindrical shape of a determined length in the axial direction, and is movable in the axial direction in that the outer circumference closely contacts the inner circumference of the inner hole 3 of the cylinder barrel 1. In addition, an inside hole 21 of the ring 20 has a dimension of forming a specified passage in relation with the outer circumference of the ring head 30. Such a front end of the ring 20 serves as a pressing portion 22 for urging to push out the raw material of soy beans, while a rear end is a taper 23 having the same taper angle as that of the taper part 12 of the piston head portion 11.

Details of the ring head 30 will be explained with reference to FIG. 2B. The ring head 30 comprises ahead portion 31 at a front end, an axial part 32 having a smaller diameter than that of the head portion 31, a contact part 33 having a larger diameter than that of the axial part 32, and a screw 34. By urging the screw 34 into the female screw defined at the front end of the piston 10, the ring 20 is furnished to the piston 10 at its front end. To the axial portion 32 of the ring head 30, a plurality of radially expanding arms 35, 35 are moderately fitted with bearings. The arms 35, 35 . . . are engaged at front ends with the inner circumference of the ring 20. Accordingly, if the piston 10 is driven to the right side of FIG. 1, the arms 35, 35 . . . move the axial part 32 by a fixed amount and contact the head portion 31. When contacting the head portion 31, the ring 20 is driven together with the piston 10, and a distance until contacting the head portion 31 is a space between the taper part 12 of the piston head 11 and the taper part 23 of the ring 20, and by this space, a face-like supply passage 36 is secured. Further, if the piston 10 is driven to the left side of FIG. 1, i.e., in the pressing direction, the arms 35, 35 . . . move the axial part 32, so that the taper part 23 of the ring 20 seats on the taper part 12 of the piston head 11, whereby the face-like supply passage 36 is closed.

The piston 10 structured as mentioned above gets out outside from the rear part of the cylinder barrel 1 and is mechanically connected to the piston drive device 40 having a motor 41. An output shaft 42 of the motor 41 is connected to the rear part of the piston 10 through a transmission mechanism 43 and an output shaft 44 thereof. The transmission mechanism 43 has ball screws and ball nuts screwed in the ball screws, so that rotating action of the motor 41 is changed into linear action of driving the piston 10 in the axial direction.

Figure 2A:
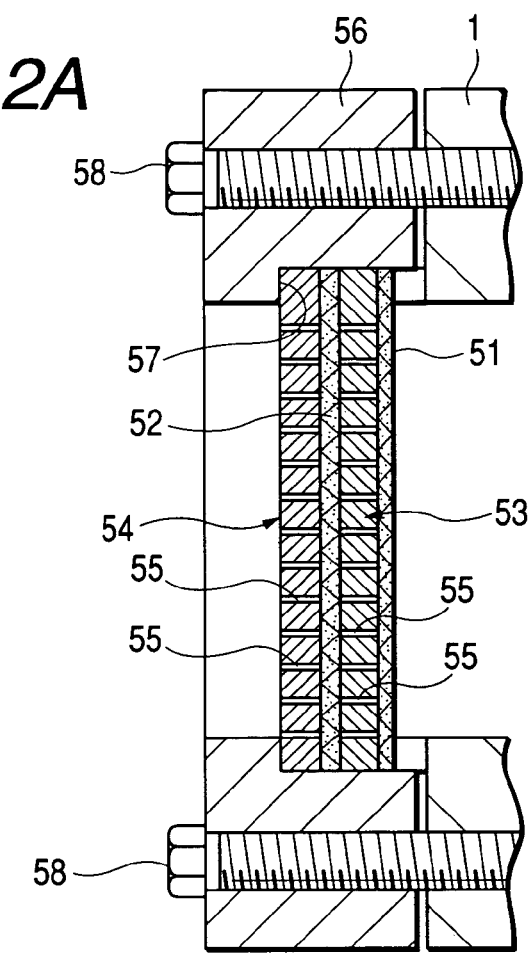
FIGS. 2A and 2B are cross sectional and side views showing the elementary parts of the apparatus of manufacturing soymilk products concerned with the embodiment of the invention.

The homogenizing unit 50 is enlarged in FIG. 2A, and this embodiment is composed of first and second screens 51, 52, first and second screen supporters 53, 54, and a screen pushing member 56. The screens 51, 52 are formed by combining screens of various sieve holes. Sizes of the sieve holes are selected to be 60 to 500 mesh in this embodiment. The first and second screen supporters 53, 54 are composed of plate-like members of determined thickness in the embodiment, and are formed with many holes 55, 55 . . . of 1 to 3 mm diameter. Being composed of the plate-like members of the determined thickness, the screen supporters 53, 54 have strength enough to receive pressure loading thereon. The screen supporters have almost the same sizes as those of the screens 51, 52. The outer diameter of the screen pushing member is almost the same as that of the cylinder barrel 1, and the inner hole is also the same as the inner hole 3 of the cylinder barrel. At the side of the cylinder barrel 1 of the screens pushing member 56, a step 57 is formed with a fixed depth.

The first and second screens 51, 52 and the first and second screen supporters 53, 54 composed as mentioned above are, as shown in FIG. 2A, combined double-stepwise, and are detachably attached to the front end of the cylinder barrel by a plurality of bolts 58, 58 . . . under a condition of positioning owing to the step 57 of the screen pushing member 56.

For supplying the raw material of soy beans, depending on practiced styles, pumps of various types may be applied. For instance, a pump such as a snake pump may be used which forcibly supplies the raw material of soy beans. FIGS. 1, 2A and 2B do not show a raw material supply apparatus comprising such a pump.

Next, the method of manufacturing the soymilk using the method of manufacturing the above mentioned products of soymilk will be explained in regard to an example in combination of automatic and manual operations for convenience, though the automatic operation is also available. At first, weighing strokes, weighing time and pushing speed are determined. As shown in FIG. 1, the motor 41 is driven to retreat the piston 10 until the set weighing stroke for the set weighing time, so that the face-like supply passage 36 is formed between the taper portion 12 of the piston head part 11 and the taper portion 23 of the ring 20. The condition where the face-like supply passage 36 is formed is illustrated in FIG. 1. At the same time when the piston 10 goes back, the raw material supply apparatus (not shown) is driven and the smothered or immersed roughly ground raw material of soy beans are fed into the piston 10 from the radius directional supply pipe 14 through the supply pipe 7. The fed raw material of soy beans passes the raw supply passage 13 within the piston 14, the raw material supply passage 13 within the piston 10, the face-like supply passage 36 between the taper portion 12 of the piston head 11 and the taper portion 23 of the ring 20 from the plurality of diverged supply passages 15, 15 . . . , passes between the inner circumference of the ring 20 and the outer circumference of the ring head 30, and are stored in the storage chamber 4 at the front end of the cylinder barrel 1. Coming to the set weighing time, the piston 10 stops going back and the raw material supply apparatus (not shown) ceases supplying the raw material of soy beans, and the weighing is finished. A non filled space of the storage chamber 4 at the front end of the cylinder barrel 1, which is created by retreating the piston 10 for the set weighing time, is all filled with the raw material of soy beans, and the supply amount of the raw material supply apparatus is adjusted to be no space.

The weighing is ended, the motor 41 is again driven to move the piston 10 forward at the set pushing speed. Since predetermined frictional force is caused thereby between the outer circumference of the ring 20 and the inner circumference of the cylinder barrel 1, the arms 35, 35 . . . move the axial part 32 as mentioned above, and the taper portion 23 of the ring 20 seats on the taper portion 12 of the piston head part 11, so that the face-like supply passage 36 is closed. The condition of seating and being closed is illustrated in FIG. 2B.

Subsequently, the piston 10 and the ring 20 are driven forward in combination. Thereby, the raw material of soybeans stored in the storage chamber 4 of the cylinder barrel 1 is pushed toward the homogenizing unit 50 by the pushing face 22 of the ring 20 and the head portion 31 of the ring head 30, and is pushed outside via the first and second screens 51, 52 and the first and second screen supporters 53, 54. When passing the screens 51, 52, the raw material of soy beans is pushed out while being extremely pulverized, and the products of very fine soymilk are manufactured. By the way, the screens 51, 52 are avoided by the screen supporters 53, 54 from deformation caused by pressure when pushing out. When finishing to push out, the motor 41 is again started to weigh. Through finally grinding the raw material of soy beans in the same manner as above mentioned, the products of soymilk are manufactured in the following.

The invention is not limited to the above embodiment, and various modifications are practical. For instance, the raw material supply passage 13 may be extended more rearward than the rear part of the cylinder barrel 1, whereby the radius directional supply pipe 14 may be formed outside of the cylinder barrel 1 as shown with "A" in FIG. 1. Further, as shown with "B" in the same, the output shaft 44 is composed of a tubular member having an interior being the raw material of soy beans supply passage and a tubular flange being connected to the rear end of the piston 10. The storage chamber head part 11 of the storage chamber 10, the ring 20, and the ring head 30 cooperate to press out the raw material of soy beans and also serve as a check valve as a back-flow preventing ring used to a blowing machine.

Figure 2B:
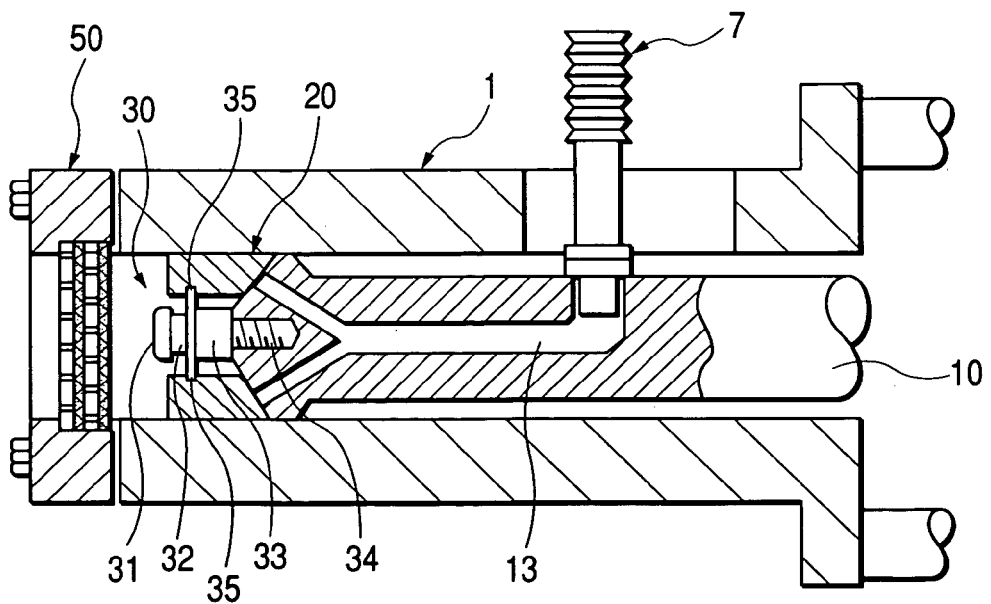

The homogenizing unit 50 has the screens in double step in the embodiment shown in FIGS. 1, 2A and 2B. Apparently, one step or more than triple steps may be practical. The screen supporters 53, 54 work to mainly avoid deformation from the screens 51, 52, and are not limited to the illustrated embodiment but may be served with closed bars. If sufficiently controlling a working oil, the piston 10 may be driven with a hydraulic piston mechanism.

Example: For the apparatus of manufacturing products of soymilk, as shown in FIG. 1, the diameter of the cylinder barrel was 120 mm and the axial length of the same was 600 mm. The raw material of soy beans was roughly ground with water and smothered.

Using the apparatus of manufacturing the products of soymilk and the raw material of soy beans, the screens were 60 to 500 meshes, and the screen supporters were formed with 1450 holes of 1 mm diameter at the inlet mouth. The pushing speed was tested at 282 to 2827 $cm^3/s$ and pressure of 8.0 to 55.0 MPa. The raw material of soy beans at 30° C. was fed to the cylinder barrel, but temperature hardly went up owing to the pushing pressure.

As a result of the test, when the raw material of soy beans passed the screens, the soy beans including even navels and the hulls were uniformly and extremely refined, and when the produced soymilk was received in a beaker and still left, there were seen no particles adhered to the wall of the beaker and no deposits on the bottom. Tasting the soymilk, the product was not rough to the tongue nor spoiled the feeling or tint. Observing through a microscope, no living germs or bacilli were seen. It is assumed that the raw material of soy beans was disinfected owing to pressure or shearing force during pressing it out.

As mentioned above, the invention comprises the steps of storing the immersed or smothered raw material of soy beans including hulls in the storage chamber provided at the front part of the cylinder barrel, subsequently passing the raw material of soy beans stored in the cylinder barrel through the screens furnished at the front end of the cylinder barrel by driving the piston in the axial direction, said piston being provided movably in the axial direction, and urging to press it out, thereby to manufacture a milk of the soy beans of the raw material being extremely refined. The invention may manufacture products of soymilk from the raw material of soy beans of all grains including the hulls and an apparatus used to reducing this method to practice, neither needing any especial grinding apparatus nor taking a long time as reacting the enzyme or creating the lees of bean curd via a simple operation, and manufacturing the products of soy bean processed foods such as soymilk or bean curds being soft feeling to the tongue. In addition, such an effect may be provided that the raw material of soy beans is disinfected owing to pressure or shearing force during pressing it out.

What is claimed is:

1. An apparatus of manufacturing soymilk products, comprising:

a cylinder barrel including a storage chamber;

a piston driven in an axial direction of said cylinder barrel;

a ring disposed on a side of a front end of said piston so as to be movable in the axial direction of said cylinder barrel; and a homogenizing unit provided at a front end of the cylinder barrel;

wherein a raw material of soy beans including hulls in said storage chamber is pressed out from the homogenizing unit when the piston is driven, and a supply passage for said raw material of soy beans is formed in said piston, said supply passage is communicated with said a storage chamber of said cylinder barrel when said piston is retreated, and is closed when said piston is advanced.

2. An apparatus of manufacturing soymilk products according to claim 1, wherein said homogenizing unit includes at least one screen whose scale of mesh is in a range between 60 to 500 meshes, and a screen supporter provided with a plate member on which a plurality of through holes are formed.

3. A apparatus of manufacturing soymilk products according to claim 1, wherein said homogenizing unit is configured so that a plurality of said screens and a plurality of said screen supporters are disposed.

* * * * *